Sept. 27, 1966 A. WILLIAMS 3,275,062
HEATING, EVAPORATING AND CONCENTRATING APPARATUS AND PROCESSES
Filed May 22, 1964 2 Sheets-Sheet 2

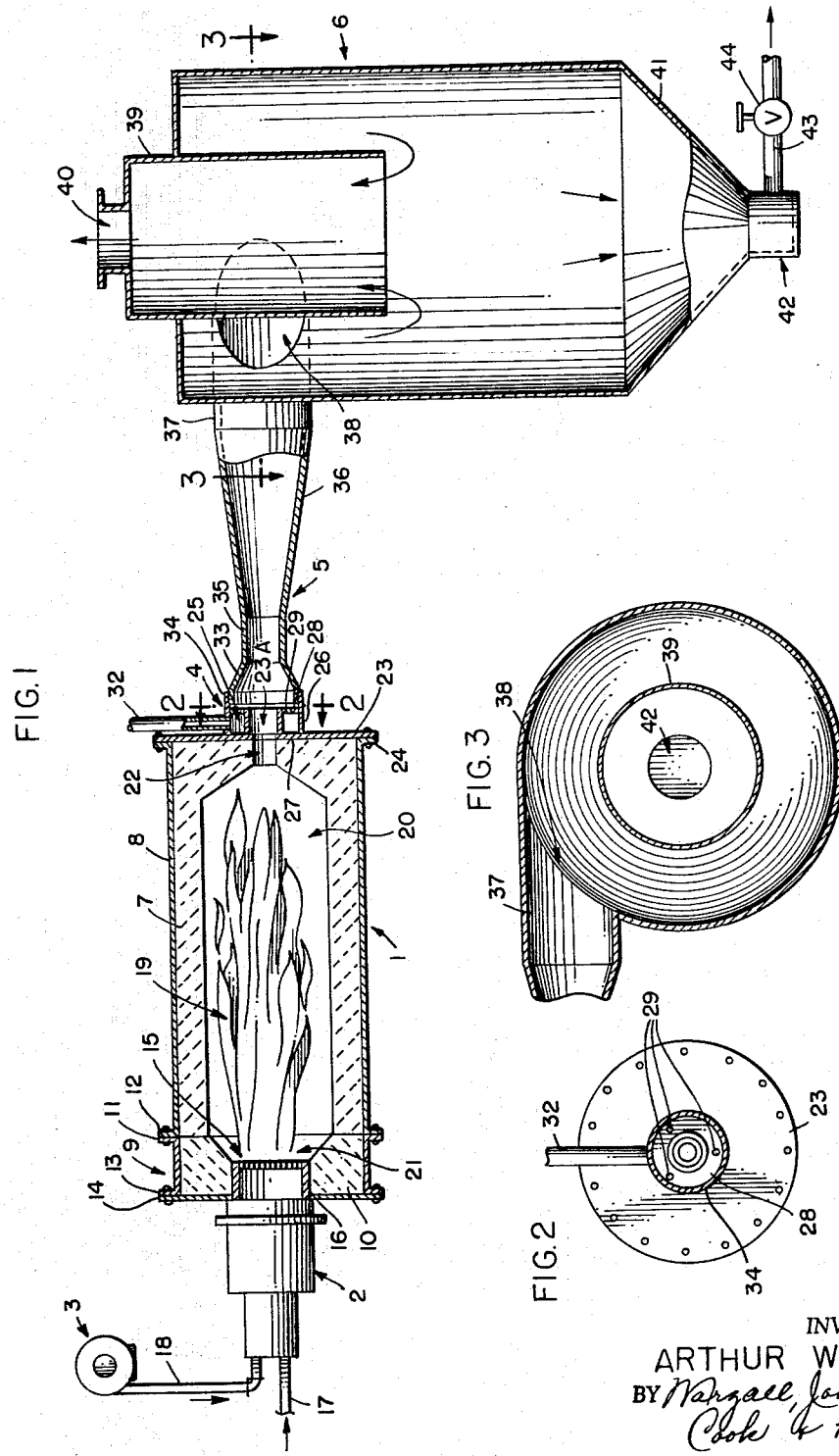

INVENTOR:
ARTHUR WILLIAMS
BY
ATT'YS

United States Patent Office 3,275,062
Patented Sept. 27, 1966

3,275,062
HEATING, EVAPORATING AND CONCENTRATING APPARATUS AND PROCESSES
Arthur Williams, Munster, Ind., assignor to Submerged Combustion, Inc., Hammond, Ind., a corporation of Indiana
Filed May 22, 1964, Ser. No. 369,528
6 Claims. (Cl. 159—4)

This invention relates to heating, evaporating and concentrating apparatus and processes and is more particularly concerned with apparatus and processes for heating a liquid, apparatus and processes for evaporating a liquid, apparatus and processes for concentrating a liquid, and apparatus and processes for recovering a solid from a liquid.

It is well known to heat a liquid by submerged combustion wherein the flame is brought into direct contact with the liquid and the combustion chamber is at least partially immersed in the liquid. This process has been very satisfactory but suffers from the disadvantage that the combustion chamber is often eroded by the liquid being heated. This is particularly true in the case of acid liquors, such as acid pickling baths, or where the liquid being heated contains dissolved solids, such as saline solutions.

One of the objects of the present invention is to provide a new and improved process and apparatus for heating, evaporating and concentrating liquids wherein erosion and corrosion of the combustion chamber are eliminated.

A more specific object of the present invention is to provide a process of heating a liquid with hot gases under conditions which minimize erosion and corrosion.

A further more specific object of the invention is to provide a new and improved process for evaporating liqiuds wherein erosion and corrosion are minimized.

Another specific object of the invention is to provide a new and improved process for recovering solids from a liquid wherein erosion and corrosion are minimized.

Still a further object of the invention is the provision of new and improved apparatus for carrying out processes of the type described.

Other objects and advantages of the invention will appear from the following description in conjunction with the accompanying drawings in which:

FIGURE 1 is an elevational view, partly in section, of one form of apparatus embodying the invention which is adapted for heating and evaporating a liquid;

FIGURE 2 is a sectional view taken through the line 2—2 of FIGURE 1;

FIGURE 3 is a sectional view taken through the line 3—3 of FIGURE 1;

Figure 4:
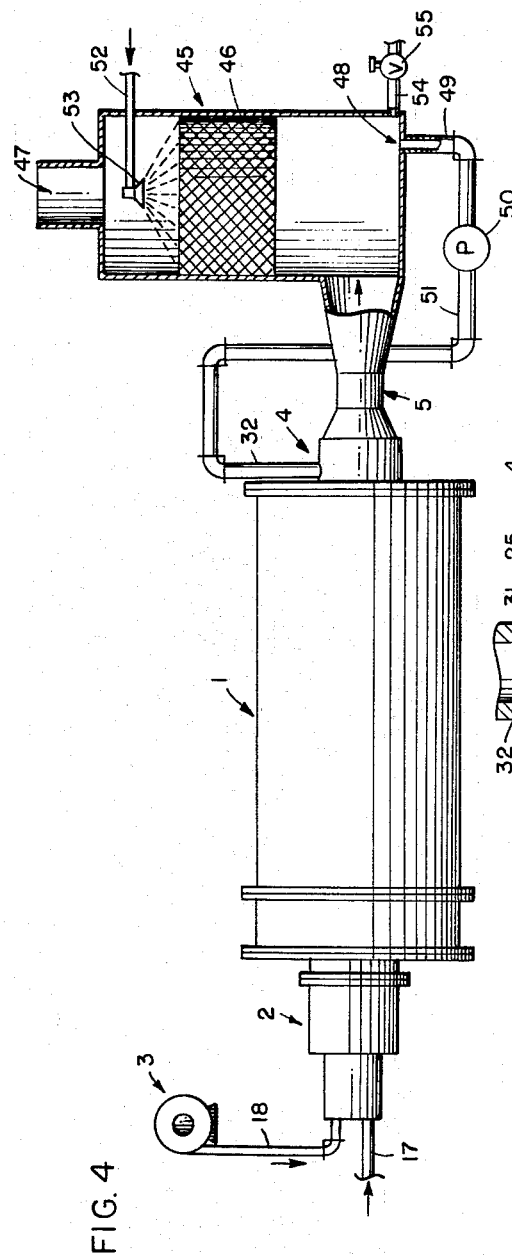
FIGURE 4 is an elevational view, partly in section, of a modified form of the apparatus shown in FIGURE 1 which is adapted for heating a liquid substantially without evaporating or concentrating it.

In its broad concept, the invention involves a process and apparatus for heating a liquid wherein hot gases normally under superatmospheric pressure are forced through an inlet at one end and an outlet at the opposing end of a refractory lined combustion zone, a liquid to be heated is introduced into the converging end of a converging-diverging zone adjacent the outlet end of said combustion zone, thereby forming a mixture of hot gases and liquid, and the mixed hot gases and liquid are passed through the diverging end of said converging-diverging zone to a separation zone where the gases are separated from the liquid.

In an ordinary process and apparatus for heating a liquid such as a hot water heater, the liquid to be heated is preferably introduced into the separation zone and circulated to the converging end of the converging-diverging zone adjacent the outlet end of the combustion zone.

In an evaporation or a concentration process the liquid to be heated is introduced directly into the converging end of the converging-diverging zone adjacent the outlet end of the combustion zone, the mixed hot gases and liquid are passed through the diverging end of said converging-diverging zone and at least a part of the vapors from the liquid, as well as all of the incondensible gases, are thereafter separated from the residual liquid. If the liquid contains dissolved solids, the residual liquid will also contain dissolved solids. These dissolved solids can be crystallized from the residual liquid in a separate vessel or they can be recovered from the bottom of the separator vessel into which the mixture of hot gases and liquid has been discharged from the diverging end of said converging-diverging zone.

Where the process and apparatus are used merely for heating a liquid, the separator zone preferably consists of a packed tower, the mixture of gases and liquid from the converging-diverging zone being introduced into the lower part of the tower beneath the packing.

Where the liquid contains dissolved solids, the separator preferably takes the form of a cyclone separator in which the mixture of hot gases and liquid containing dissolved solids are introduced tangentially into the top of a cylindrical vessel provided with a concentric tubular baffle member in the upper part thereof and a conical bottom through which solids or concentrated liquor can be removed. In this case, the incondensible gases and vapors are removed by being passed upwardly through an outlet in the concentric baffle.

In a preferred specific embodiment of the invention the apparatus comprises an elongated combustion chamber lined with a refractory material and having an inlet and outlet for hot gases, a burner mounted in said inlet, means associated with said burner for forcing gases under superatmospheric pressure through said inlet, a tubular member mounted outside of and adjacent said outlet, said tubular member being provided with a passageway in alignment with said outlet, an annular chamber in said tubular member around said passageway, said chamber having an outer wall, a rear wall and a forward wall, said forward wall having a plurality of slanted openings therein, the center lines of said openings converging at a point outside of said chamber, an inlet opening in the outer wall of said chamber, means for introducing a liquid through said last named inlet opening, an elongated converging-diverging hollow member having a tubular wall enclosing a converging portion and a diverging portion integral with an intermediate connecting throat portion, said converging portion having an inlet opening which is larger than the passageway in said tubular member, the end wall of said last named inlet opening being connected to said tubular member, said converging portion enclosing but not intersecting the center lines of said slanted openings, said diverging portion having an outlet opening, and means connected to said last named outlet opening for separating gases from liquids and solids.

Referring to FIGURE 1, the embodiment of the invention disclosed therein comprises a combustion chamber generally indicated at 1, a burner generally indicated at 2, a source of fluid pressure, such as an air compressor, generally indicated at 3, a tubular member generally indicated at 4, a converging-diverging member generally indicated at 5, and a separator and recovery vessel generally indicated at 6.

The combustion chamber 1 is elongated, being preferably two to four times as long as it is wide, and is lined with a refractory lining 7, preferably consisting of clay or other suitable refractory substance capable of adhering to the outer shell 8 and of maintaining its structural shape under high temperature conditions. The outer shell 8 is preferably cylindrical and is made of steel or other suitable metal. At one end of the combustion chamber 1, a separate combustion chamber head, generally indicated at 9, is provided which is lined with a refractory lining 10. The combustion chamber head 9 and one end of the main combustion chamber 1 are provided with outwardly extending flanges 11 and 12 which are removably secured together by bolts, or in any other suitable manner. Thus, the head 9 can be removed and replaced without replacing the entire combustion chamber. The combustion chamber head 9 is also provided with an outwardly extending end flange 13 to which is secured an end closure plate 14.

The burner 2 can be of any suitable structure capable of providing combustion under superatmospheric pressure. A suitable type of burner is one in which air and gas are passed through concentric tubes to a burner plate 15 mounted in a tubular casing 16 which in turn is mounted in the combustion chamber head 9. A suitable type of burner is illustrated in U.S. 2,432,942. However, in the application of this burner to the present invention the burner it not employed in a submerged combustion system. Other suitable types of burners can be employed. In the type of burner illustrated in FIGURE 1 a fuel gas, such as natural gas, is introduced through line 17 from a suitable source, not shown, and air, oxygen or other combustion-supporting gas is introduced through line 18 from a suitable source, not shown, by way of the compressor generally indicated at 3. The fuel and combustion-supporting gas, such as air, are mixed at burner plate 15 producing a flame generally indicated at 19 which expands in the elongated space 20 of combustion chamber 1. Expansion of the burning gases occurs at the inlet end 21 of combustion chamber 1 and the movement of the hot gases is restricted to cause them to pass through opening 22 in the outlet end of the combustion chamber 1. The outlet end of the combustion chamber 1 is provided with an end closure plate 23 made of metal or other suitable material, which is secured by means of bolts to the flanged end 24 of the outer shell 8 of combustion chamber 1.

Figure 5:
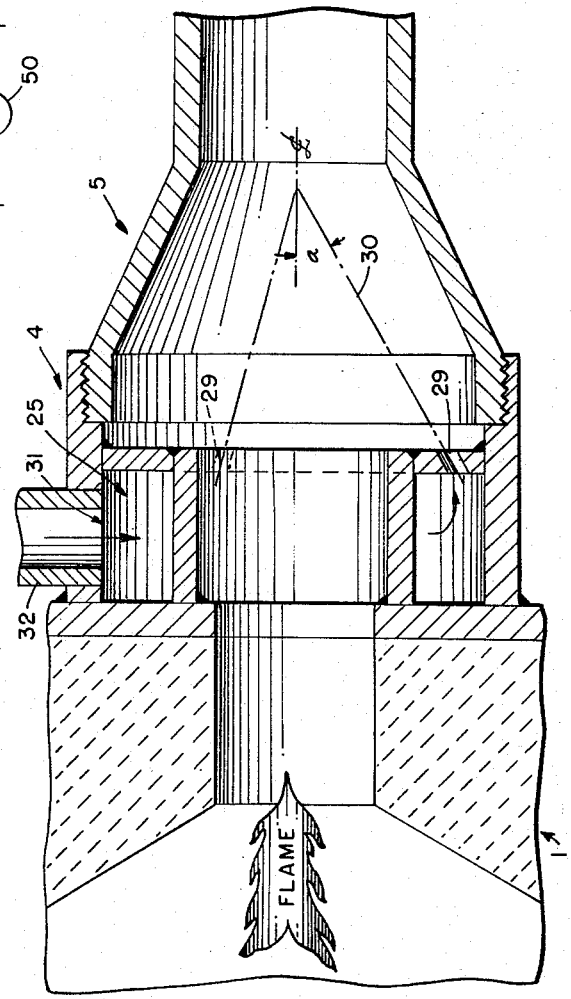
FIGURE 5 is an enlarged sectional detailed view of one portion of the apparatus illustrated in FIGURE 1.

As hot gases from combustion chamber 1 are forced through outlet opening 22 they enter a tubular passageway 23A in the tubular member 4 which is secured to the end closure 23 of combustion chamber 1. The tubular member 4 has an annular chamber 25 which has an outer wall 26, a rear wall 27 and a forward wall 28. The forward wall 28 is provided with a plurality of slanted openings 29 as illustrated in more detail in FIGURE 5. According to one embodiment of the invention there are three such openings spaced 120° apart and so arranged that their center lines 30 coincidentally converge at a point outside of the annular chamber 25 as illustrated in FIGURE 5.

The chamber 25 is provided with an inlet opening 31 (FIGURE 5) to which there is connected a feed pipe 32 through which a liquid to be heated is introduced into the chamber 25.

The converging-diverging member 5 has a converging portion 33 which is secured, preferably by means of threads, or in any other suitable manner, to an extension 34 of the outer wall of the tubular member 4. The converging portion 33 of member 5 terminates in a throat portion 35 which is integrally formed with a diverging tubular section 36. The latter is connected at its outlet end, preferably by means of threads, or in any other suitable manner so that it can be removed, to a tube or pipe 37, which in the embodiment shown in FIGURE 1, discharges tangentially through an opening 38 in the upper part of separating vessel 6.

The separator vessel 6 is provided with a concentric tubular baffle 39 which extends below the opening 38 and permits the exit of incondensible gases and condensible vapors through an opening 40. Concentrated liquids and/or solids fall to the bottom of vessel 6 and are directed by means of the conical portion 41 to an outlet generally indicated at 42 where they are withdrawn through line or pipe 43 controlled by valve 44.

In the type of process and apparatus illustrated in FIGURE 1, various types of materials can be evaporated and concentrated. Thus, the apparatus and process can be applied to concentrating a waste sulfite liquor which is a by-product of the paper industry, for example, with a burner having a capacity of $11 \times 10^6$ B.t.u./hr. Such a liquor can be concentrated from 16% solids to 65% solids. Similarly, sodium sulfate solutions can be concentrated to the point where the sodium sulfate can be crystallized as $Na_2SO_4$.

In the type of apparatus illustrated in FIGURE 4, the structure of the apparatus is the same as in FIGURE 1 except that the converging-diverging member 5 is connected either directly or through a suitable pipe to a packed tower generally indicated at 45. The tower 45 is provided with packing 46 consisting of Raschig rings, Pall rings, or other suitable packing which is adapted to permit the escape of incondensible gases while restricting the escape of condensible vapors. The tower 45 has a top opening 47 through which incondensible gases are removed, such as, for example, nitrogen and undissolved carbon dioxide, as well as some condensible vapors which pass through the packing 46. The lower part of the tower 45 is connected through an outlet 48 to a pipe 49 which in turn is connected to the inlet side of a pump 50. The outlet side of the pump 50 is connected to a pipe 51 which is connected to the feed pipe 32 corresponding to the feed pipe 32 in FIGURE 1. This type of apparatus is especially useful for heating liquids, such as water, where it is not desired to evaporate large quantities of the liquid. The liquid to be heated is introduced into the system through pipe 52 which is connected to a spray head 53, thereby causing the liquid to be dispersed above the packing 46. The hot liquid can be withdrawn through pipe 54 in the lower part of tower 45 which is controlled by valve 55. The temperature of the liquid in the tower 45 can be controlled by suitable thermostatic means to which the operation of the burner 2 is responsive. The particular control means employed for this purpose does not constitute a part of this invention.

It will be recognized that one method of controlling the process illustrated in FIGURE 1 is to maintain a liquid level in the bottom of the separator 6 by means of a level control which in turn would control the liquor feed rate through pipe 32 so as to pump liquor through pipe 32 at a rate somewhat in excess of the maximum evaporation rate. The rate of heat fired would be set manually and the level control would adjust the liquor feed rate to correspond.

When the end product of the process is an anhydrous salt or chemical, another method of control is to operate with a slight amount of superheat in the gases leaving member 5. A temperature sensing device in the diverging portion of member 5 is used to control either the rate of feed of the liquor or the flow of fuel gas. Since the temperature of the gases leaving the member 5 is higher than normal, to an extent depending upon the sensitivity and accuracy of the temperature control device, there is a slight loss in efficiency. Thus, assume it were necessary to allow a variation in outlet gas temperatures from member 5 from 200° F. to 240° F. for proper operation of the temperature controller. At 240° F. the efficiency is 84.7% as compared with 87.4% at the normal temperature of 194° F. This would be true in a true flash evaporator, with no liquid in the outlet from member 5, the discharge from the separator bottom outlet 43 would then be the anhydrous salt or chemical. In this method the material is evaporated to dryness.

Still another control method can be used for concentrating a material from a lower to a higher concentration with no recirculation. Either the fuel gas flow is set manually to the desired heat rate, the feed rate adjusted automatically to give the final concentration, or the feed is set and the fuel gas flow adjusted automatically to give the final desired concentration.

The invention makes it possible to heat a liquid very rapidly and with high efficiency. For example, a unit of the type described with reference to FIGURE 1, using 2600 cubic feet of air per hour and 200 cubic feet of natural gas per hour at total pressure of 3.0 p.s.i.g. will heat water from a temperature of 60° F. to 190° F. in 45 seconds. Where the size of the combustion chamber is approximately 6½" x 21", the converging portion of member 5 is approximately 2 9/16" in length, 2¾" maximum diameter and 13/16" minimum diameter, the throat portion is 1" in length by 13/16" in diameter, and the diverging portion diverges at an angle of 7° from the throat portion through a length of 11¼" from a minimum diameter of 13/16" to a maximum diameter of 2 3/16".

An important advantage of the invention is that the combustion chamber is not in contact with the liquid to be heated, evaporated or concentrated. In a conventional submerged combustion system, the combustion chamber is located in a vessel, is surrounded by the liquid to be heated and transmits heat through its walls to the liquid. About one-third of the heat transferred is through the combustion chamber walls. In any structure in which the combustion chamber is surrounded by the liquid and transfers heat through its walls, there is greater erosion and corrosion. There is also a greater possibility for deposition of solids on the walls of the combustion chamber where the liquid contains dissolved solids. These solids not only produce erosion and corrosion but tend to accumulate and clog the system. In the present process, the mixing of the liquids and the hot gases which takes place beyond the combustion zone is so violent that no deposition occurs. The throat between the converging portion and the diverging portion of the converging-diverging member squeezes the liquid and gases together to give a high velocity and intimate mixing. In the diverging section the kinetic energy is changed to recovered pressure energy which decreases the air pressure required to force the burning gases through the system.

The invention is hereby claimed as follows:

1. In a heating apparatus an elongated combustion chamber lined with a refractory material and having an inlet and an outlet at opposite ends, a burner mounted in said inlet, a tubular member outside of said combustion chamber and adjacent said outlet, a combustion gas discharge tube of substantially smaller diameter than said tubular member and positioned within said tubular member, said discharge tube being in alignment with said outlet to define a combustion gas passageway extending downstream from said combustion chamber, a transverse, upstream wall and a transverse, downstream wall defining together with said discharge tube and said tubular member an annular chamber about said discharge tube, said downstream wall having a plurality of slanted openings therein, the center lines of said openings converging obliquely, coincidentally, and axially downstream at a point downstream of said discharge tube in alignment with said passageway, means for feeding a liquid into said annular chamber, an elongated converging-diverging hollow member having a tubular wall enclosing a converging portion and having a diverging portion integral with an intermediate connecting throat portion, said converging portion having an inlet opening which is larger than the passageway in said tubular member, said converging portion enclosing but not intersecting the center lines of said slanted openings, and said diverging portion having an outlet opening, said combustion chamber, said tubular member and said converging-diverging hollow member all being secured together, with the converging portion of said converging-diverging hollow member removably secured to said tubular member.

2. In a heating apparatus, an elongated combustion chamber lined with a refractory material and having an inlet and an outlet for hot gases, a burner mounted in said inlet, means associated with said burner for forcing gases under superatmospheric pressure through said inlet, a tubular member mounted outside of and adjacent said outlet, a combustion gas discharge tube of substantially smaller diameter than said tubular member and positioned within said tubular member, said discharge tube being in alignment with said outlet to define a combustion gas passageway extending downstream from said combustion chamber, a transverse, upstream wall and a transverse, downstream wall defining together with said discharge tube and said tubular member an annular chamber about said discharge tube, said downstream wall having a plurality of slanted openings therein, the center lines of said openings converging obliquely, coincidentally and axially downstream at a point downstream of said discharge tube, means for introducing a liquid into said annular chamber, an elongated converging-diverging hollow member having a tubular wall enclosing a converging portion and having a diverging portion integral with an intermediate connecting throat portion, said converging portion having an inlet opening which is larger than the passageway in said tubular member, the upstream end of said converging portion being connected to said tubular member, said converging portion enclosing but not intersecting the center lines of said slanted openings, said diverging portion having an outlet opening, and means connected to said last named outlet opening for separating gases from liquids and solids.

3. A process for heating or evaporating a liquid by direct heat exchange with hot combustion gases, which comprises introducing hot combustion gases axially into the upstream end of a tubular, direct heat exchange zone, flowing said hot combustion gases in the downstream direction through said heat exchange zone, directing into said hot gases in the upstream portion of said zone a plurality of streams of liquid to be heated in a downstream direction and in orientations of coincidental convergence of said streams in the upstream portion of said zone, thereby mixing said liquid and said hot combustion gases for direct heat exchange therebetween, and thereafter separating the gases from the remaining heated liquid in a separation zone.

4. A process as claimed in claim 3, wherein said separating is effected by flowing said gases upwardly through a packed bed of solids in said separation zone, flowing downwardly through said bed the feed portion of the liquid to be heated, withdrawing from the separation zone at a point below said packed bed a portion of the accumulated liquid, and feeding the latter to said heat exchange zone in the form of said plurality of streams.

5. A process as claimed in claim 3 wherein a portion of said heated liquid, after separation from the gases, is fed from said separation zone into said heat exchange zone in the form of said plurality of streams.

6. In a direct heat exchange apparatus, an elongated combustion chamber, a burner mounted on and communicating with the upstream end of said chamber, said chamber having a hot gas outlet opening in the downstream end, a tubular, direct heat exchange member mounted on the downstream end of said combustion chamber and extending axially therefrom in the downstream direction, said tubular, heat exchange member defining a passageway in axially aligned communication with said opening, wall means defining an annular passage at the upstream end of said tubular, direct heat exchange member, means for feeding a liquid to be heated to said annular passage, and a plurality of circumferentially-spaced orifices communicating the upstream end of said tubular, heat exchange member and said annular passage, said orifices having slanting center lines which converge coincidentally in the downstream direction in the upstream portion of said tubular, heat exchange member.

References Cited by the Examiner
UNITED STATES PATENTS
| | | | |
|---|---|---|---|
| 1,933,254 | 10/1933 | Goodell | 23—48 |
| 2,616,790 | 11/1952 | Swindin | 23—126 |
| 2,790,838 | 4/1957 | Schrader | 23—277 X |
| 2,823,243 | 2/1958 | Robinson | 23—288 X |
| 2,879,838 | 3/1959 | Flynt et al. | 159—4 |
| 2,879,862 | 3/1959 | Burden | 23—277 |
| 2,934,410 | 4/1960 | Smith | 23—277 |
| 3,116,344 | 12/1963 | Diesler | 23—277 X |

FOREIGN PATENTS
889,259  2/1962  Great Britain.

NORMAN YUDKOFF, *Primary Examiner.*

J. SOFER, *Assistant Examiner.*